United States Patent [19]

Izuno

[11] Patent Number: 5,130,619
[45] Date of Patent: Jul. 14, 1992

[54] DRIVE CONTROL APPARATUS FOR AN ULTRASONIC MOTOR

[75] Inventor: Yuji Izuno, Osaka, Japan

[73] Assignee: Kubota Corporation, Osaka, Japan

[21] Appl. No.: 652,414

[22] Filed: Feb. 7, 1991

[30] Foreign Application Priority Data

Dec. 26, 1990 [JP] Japan .................................. 2-406411
Dec. 26, 1990 [JP] Japan .................................. 2-406412

[51] Int. Cl.⁵ .......................................... H01L 41/08
[52] U.S. Cl. ...................................... 318/116; 310/316
[58] Field of Search ............... 310/316, 317, 323, 328; 318/116

[56] References Cited

U.S. PATENT DOCUMENTS

| | | | |
|---|---|---|---|
| 4,692,649 | 9/1987 | Izukawa et al. | 310/316 |
| 4,713,571 | 12/1987 | Suzuki et al. | 310/316 |
| 4,727,276 | 2/1988 | Izukawa et al. | 310/316 |
| 4,749,896 | 6/1988 | Suzuki | 310/316 |
| 4,833,358 | 5/1989 | Suzuki et al. | 310/316 |
| 4,888,514 | 12/1989 | Takahashi et al. | 310/316 |
| 4,914,337 | 4/1990 | Takagi | 310/316 |
| 4,952,834 | 8/1990 | Okada | 310/316 |
| 5,013,982 | 5/1991 | Sasaki | 318/116 |
| 5,021,700 | 6/1991 | Takahashi et al. | 310/316 |

Primary Examiner—Mark O. Budd
Attorney, Agent, or Firm—Webb, Burden, Ziesenheim & Webb

[57] ABSTRACT

A drive control apparatus for an ultrasonic motor having a vibrator with a piezoelectric element and an elastic element. The apparatus comprises a power source for supplying alternating power to the piezoelectric element, a voltage detecting device for detecting a voltage applied to the vibrator, a sensor for detecting a vibrator state signal dependent on vibrating velocity of the vibrator, and a control device for controlling the ultrasonic motor with reference to the vibrator state signal. For automatic resonant frequency tracking control, the control device controls oscillating frequency of the power source to maintain a phase difference between frequency of the vibrator obtained from the vibrator state signal and frequency of the voltage supplied to the vibrator at a predetermined value. For constant velocity amplitude control, the control device controls output voltage of the power source to maintain the vibrator state signal at a predetermined value.

15 Claims, 7 Drawing Sheets

DRIVE CONTROL APPARATUS FOR AN ULTRASONIC MOTOR

BACKGROUND OF THE INVENTION

1. Field of the Invention

The present invention relates to a drive control apparatus for an ultrasonic motor having a driving vibrator with a piezoelectric element and an elastic element.

More particularly, the invention relates to a drive control apparatus for an ultrasonic motor comprising a vibrator acting as a stator or rotor and including a piezoelectric element and an elastic element fixed together, and a rotor or stator in pressure contact therewith, for producing torque with action of a traveling wave generated with the elastic element by high frequency power supplied to the piezoelectric element, or for a linear ultrasonic motor comprising piezoelectric elements provided at opposite ends of a columnar elastic element and a slider slidable along the elastic element.

2. Description of the Prior Art

Conventionally, this type of drive control apparatus for an ultrasonic motor comprises a frequency control device for controlling oscillation frequency of a power supply device. The frequency control device includes a detecting piezoelectric element provided separately from a vibrating piezoelectric element on the elastic element for detecting a vibrating state of the vibrator. An output voltage corresponding to a vibrating amplitude of the vibrator is detected and maintained at a predetermined level.

In order that the ultrasonic motor operate efficiently and steadily regardless of variations in the mechanical resonant frequency of the elastic element due to variations in use environment and conditions such as temperature, load and drive voltage, it is necessary for the vibrating state of the vibrator to follow the resonant frequency.

For this purpose, the drive control apparatus must include a state quantity detecting device for detecting the vibrating state of the vibration or certain quantities of states such as displacement, velocity, acceleration and the like. Output of the detection provides the basis for maintaining source frequency at an optimal frequency for to the piezoelectric element.

According to the prior art noted above, however, it is necessary for the elastic element to have a detecting piezoelectric element separately from a vibrating piezoelectric element in order for the vibrating state of the vibrator to follow the resonant frequency. Besides, a wiring for taking out its signal is also needed. This has the disadvantage of not only complicating the motor manufacturing process but raising the cost of the motor.

Furthermore, such a detecting piezoelectric element, depending on dispersion of its characteristics and location of installation, does not always provide accurate detection of the vibrating state of the elastic element. Consequently, it is difficult to effect controls for an optimal operating state.

The prior art also has the following problems with regard to constant velocity amplitude control.

For speed control of an ultrasonic motor, it has been one conventional practice to control output frequency of a power source that supplies power to the piezoelectric element, to maintain at a predetermined level an output signal of a sensor such as an encoder for detecting rotational speed of the rotor.

In this case, however, the ultrasonic motor needs a sensor such as an encoder for detecting rotational speed of the rotor. Where the sensor is mounted inside the ultrasonic motor, the construction is complicated and a wiring is needed for taking out its output. This has the disadvantage of not only complicating the motor manufacturing process but raising the cost of the motor.

Even where the sensor is provided separately from the ultrasonic motor, a component is required for attaching the sensor to the output shaft of the ultrasonic motor in addition to the sensor itself such as an encoder. This again results in an increase in cost, and a detrimental effect on the simplicity of construction which is the characterizing feature of the ultrasonic motor.

The piezoelectric element of the ultrasonic motor has a drawback that the vibrating amplitude of the vibrator is greatly variable with load variations of the ultrasonic motor. It has been found that the amplitude of the vibrator increases at a time of light load to the extent of damaging the motor, and decreases at a time of heavy load such that sufficient mechanical work cannot be carried out. However, no compensatory control for such load variations is provided in the prior art, resulting in great variations in output characteristics due to the load variations.

SUMMARY OF THE INVENTION

An object of the present invention is to provide a drive control apparatus for controlling the vibrator of an ultrasonic motor for an optimal operating state.

The above object is fulfilled, according to the present invention, by a drive control apparatus for an ultrasonic motor having a vibrator with a piezoelectric element and an elastic element, comprising a power source for supplying alternating power to the piezoelectric element, a voltage detecting device for detecting a voltage applied to the vibrator, a current detecting device for detecting a current supplied to the vibrator, a generating device operable in response to the voltage and current detected for generating a vibrator state signal proportional to a vibrating velocity of the vibrator, and a control device for controlling the ultrasonic motor with reference to the vibrator state signal.

On the principle set out hereunder, the signal generating device generates, from the voltage applied to the piezoelectric element and an electrification current detection signal, a vibrator state signal including a term representing a phase difference produced by a difference between the resonant frequency of the vibrator and frequency of the applied voltage, the vibrator state signal being proportional to vibrating velocity of the vibrator. The control device controls the ultrasonic motor on the basis of the vibrator state signal, to cause the ultrasonic motor to operate in an optimal way.

The above-mentioned principle relating to the vibrator state signal will be described now.

With the theory of piezoelectric vibrator applied to the ultrasonic motor, when the power source supplies alternating voltage $\dot{V}$ to cause the piezoelectric element to vibrate at velocity $\dot{v}$, current I flowing to the piezoelectric element and vibromotive force F are expressed by the following equations based on the basic formula of electro-acoustic conversion:

$$\dot{I} = \dot{Y}\dot{V} + A\dot{v}$$

$$\dot{F} = -A\dot{V} + \dot{Z}\dot{V} \tag{1}$$

where $\dot{Y}$ is a damping admittance, A is a conversion/coupling factor of the electric and mechanical systems which is called a force factor, and $\dot{Z}$ is a mechanical impedance. The dotted variables show vector quantities.

As shown in FIG. 5, an equivalent circuit of the vibrator system is assumed in which acoustic impedance $\dot{Z}'$ is connected to a mechanical terminal. In this case, vibrating velocity $\dot{v}$ and electric terminal voltage $\dot{V}$ are in the relationship expressed by the following equation derived from the equation (1):

$$\dot{v} = A\dot{V}/(\dot{Z} + \dot{Z}') \tag{2}$$

Assuming the vibrator to be a lumped model acting as a single resonance system having mass m, stiffness s and resistance r. If $\dot{Z}' = r' + jx'$ is substituted, $$\dot{Z} + \dot{Z}' = r + r' + jx' + jm - js/$$

$$\omega r = \{-X + (x'^2 + 4ms)^{\frac{1}{2}}\}/2m \tag{3}$$

where $\omega r$ is a mechanical resonant angular frequency, and $\omega$ is an operating angular frequency.

Noting the phases $\dot{v}$ and $\dot{V}$ from the equation (2), $$\dot{v} = A/|\dot{Z} + \dot{Z}'| \exp\{-j\phi\} \cdot \dot{V} \tag{4}$$

The following three cases are conceivable.
i. $\omega < \omega r$: $\dot{v}$ is $\phi$ leading phase for $\dot{V}$
ii. $\omega = \omega r$: $\dot{v}$ is in phase for $\dot{V}$
iii. $\omega > \omega r$: $\dot{v}$ is $\phi$ lagging phase for $\dot{V}$ Further, as shown in FIG. 6, the equivalent circuit of the vibrator may be shown with a series resonant circuit L, C which generates piezoelectric mechanical vibrations, resistor R and capacitance Cd irrelevant to the vibrations. Then, the equation (1) is changed as follows:

$$\dot{I} = j\omega C d V + A\dot{v} \tag{5}$$

where $\omega$ is an angular frequency of alternating voltage $\dot{V}$.

As shown in FIG. 7, the current detecting device for detecting electrification current to the piezoelectric element outputs the following voltage Vc:

$$Vc = I/j\omega CP$$
$$= Cd\dot{V}/CP + A\dot{v}/j\omega CP \tag{6}$$

It is assumed here that the turn ratio of the transformer is 1:P and the capacitor disposed on the secondary side of the transformer has a capacity C.

The voltage detecting device for detecting the voltage supplied to the piezoelectric element outputs the following voltage Vn:

$$\dot{V}n = \dot{V}/N \tag{7}$$

It is assumed here that the transformer has a turn ratio of N:1.

Next, when the output voltages $\dot{V}c$ and $\dot{V}n$ are differentially amplified by an operating device, its output voltage Vp is expressed by the following equation:

$$\dot{V}p = K(\dot{V}c - \dot{V}n) \tag{8}$$
$$= K(Cd/CP - 1/N) V + KA/(j\omega CP) \cdot \dot{v}$$

where K is a differential gain.

When values of C, P and N are selected to provide;

$$Cd/CP = 1/N \tag{9}$$

the equation (8) may be expressed as follows:

$$\dot{V}p = KA/(j\omega CP) \cdot \dot{v} \tag{10}$$

$KA/(\omega CP)$ is a real number and therefore does not influence phase relations between $\dot{V}p$ and $\dot{v}$.

From the equation (10), the output voltage $\dot{V}p$ shows vibrating velocity $\dot{v}$ of the piezoelectric element with which its amplitude is proportional and the phase is in 90-degree lag. $KA/(\omega CP)$ may be regarded as constant if variations in the angular frequency $\omega$ of alternating voltage V are small. If the velocity v of the vibrator is set to $\dot{v} = v_o \sin \omega t$, and $\dot{V}p$ in a half cycle is averaged, then;

$$Vpm = \frac{1}{\pi} \int_0^\pi \frac{KA}{\omega CP} V_o \sin(wt) \cdot d(wt)$$
$$= \frac{2 KAV_o}{\omega CP\pi}$$

Since $2KAv_o/CP$ may be regarded as constant, $v_o$ and $\dot{v}$ become constant by controlling Vpm to be constant. If the displacement of the vibrator is $\xi$, and its amplitude is $\xi$;

$$\xi 0 = v o/\omega$$

By controlling $|Vpm|$ to be constant, the displacement $\xi$ becomes contant, that is the velocity amplitude becomes constant.

By the equation (4) showing the relationship between the velocity $\dot{v}$ and the voltage $\dot{V}$ applied to the vibrator, the equation (10) is changed to the following equation:

$$\dot{V}p = KA^2/(\omega CP|Z+Z'|)\exp\{-j(\pi/2+\phi)\}\dot{V} \tag{11}$$

The phase relations between $\dot{V}p$ and $\dot{V}$ may be classified in the following three ways:

iv. $\omega < \omega r$: $\dot{V}p$ is (90-degree $-\phi$) lagging phase for $\dot{V}$
v. $\omega = \omega r$: $\dot{V}p$ is (90-degree) lagging phase for $\dot{V}$
vi. $\omega > \omega r$: $\dot{v}p$ is (90-degree$+\phi$) lagging phase for $\dot{V}$ It will be understood from the above that the piezoelectric vibrator may be driven constantly at the resonant frequency r by causing the phase of $\dot{V}p$, i.e. the output signal of the velocity detecting device, to lag 90 degrees with respect to the voltage $\dot{V}$ supplied to the piezoelectric element.

By utilizing this principle, the drive control apparatus for an ultrasonic motor according to the present invention produces a signal reflecting the state of the vibrator with a very high degree of precision from the voltage applied and current supplied.

In a preferred embodiment of the present invention, the control device is operable, for automatic resonant frequency tracking control, to control oscillating frequency of the power source to maintain at a predetermined value a phase difference between frequency of the vibrator state signal and frequency of the voltage applied.

According to this construction, since the vibrator state signal includes a term representing a phase difference produced by a difference between the frequency of the voltage applied to the piezoelectric element and resonant frequency of the vibrator, the control device compares the phases of the output signal and the voltage applied, and controls the oscillating frequency of the power supply device to maintain the phase difference at a predetermined value. For the frequency control, a phase-locked loop may be used, for example. In this case, the oscillating frequency of the power supplying device may be controlled by supplying output of the phase-locked loop to an inverter circuit included in the power supplying device.

Thus, with the drive control apparatus for an ultrasonic motor according to the present invention, the resonant frequency of the vibrator may be followed very correctly by detecting the voltage and current supplied to the piezoelectric element and using detection results. It is therefore possible to control the ultrasonic motor to operate efficiently and in an optimal condition regardless of variations in the resonant frequency.

In a different embodiment of the present invention, the control device is operable, for constant velocity amplitude control, to control output voltage of the power source to maintain the vibrator state signal at a predetermined value.

It is also possible to control the rotational speed of the ultrasonic motor with the above predetermined value being variable.

Thus, the vibrator state signal proportional to the vibrating velocity of the vibrator may be used as a substitute for the rotational speed. It is therefore unnecessary for the ultrasonic motor to include a sensor such as an encoder for detecting the rotational speed of the ultrasonic motor, or to provide such a sensor separately from the ultrasonic motor. This is effective to avoid a cost increase of the motor and to control the ultrasonic motor to operate at a constant velocity while maintaining the simplicity of construction which is the characterizing feature of the ultrasonic motor.

Where the resonant frequency tracking control and constant velocity amplitude control are combined, the ultrasonic motor may be controlled to operate at an optimal velocity while being controlled to operate very steadily, efficiently and in an optimal condition without using a sophisticated control system.

In a further embodiment of the present invention, a drive control apparatus is proposed which has two feedback control systems for the resonant frequency tracking control and constant velocity amplitude control. This apparatus comprises a power source for supplying alternating power to the piezoelectric element, a voltage detecting device for detecting a voltage applied to the vibrator, a sensor for detecting a vibrator state signal dependent on vibrating velocity of the vibrator, and a control device for controlling the ultrasonic motor with reference to the vibrator state signal, wherein the control device is operable, for automatic resonant frequency tracking control, to control oscillating frequency of the power source to maintain at a predetermined value a phase difference between frequency of the vibrator obtained from the vibrator state signal and frequency of the voltage applied, and, for constant velocity amplitude control, to control output voltage of the power source to maintain the vibrator state signal at a predetermined value.

In this case, it is desirable that the sensor device comprises a piezoelectric element provided on the vibrator.

BRIEF DESCRIPTION OF THE DRAWINGS

The drawings show drive control apparatus for an ultrasonic motor according to the present invention, in which.

DESCRIPTION OF THE PREFERRED EMBODIMENTS

Embodiments of the present invention will be described hereinafter with reference to the drawings.

Figure 1A:
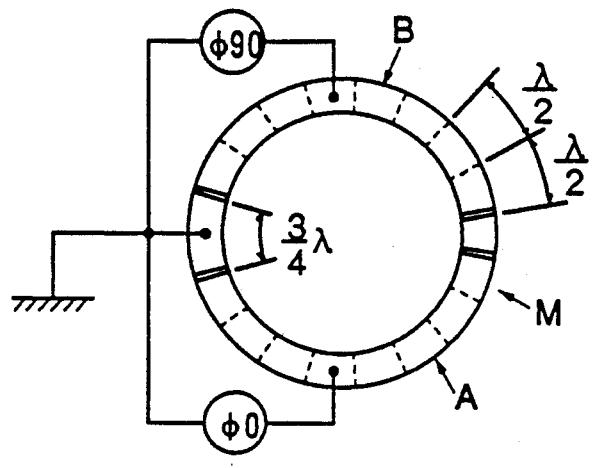
FIGS. 1A and 1B are a plan view and a view in vertical section showing the construction of an ultrasonic motor.
Figure 1B:
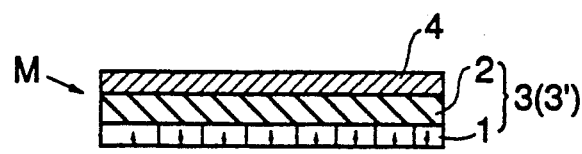

As shown in FIG. 1, an ultrasonic motor M comprises a ring-shaped stator 3 including a piezoelectric element 1 and an elastic element 2 fixed together for generating an ultrasonic traveling wave, and a rotor 4 rotatable in pressure contact with the stator 3. Thus, the stator 3 acts as a vibrator 3'. The piezoelectric element 1 is divided in the peripheral direction into two regions A and B. Each region A or B includes sections arranged in series at intervals corresponding to a half of wavelength and alternately polarized in directions of the thickness. These regions A and B are displaced by an amount corresponding to three fourths of the wavelength.

High frequency voltages having a 90-degree phase difference are applied to the regions A and B, which cause standing waves generated with the stator 3 and corresponding to the regions A and B to interfere with each other and become combined to form the traveling wave. That is, the rotor 4 is rotatable by a frictional force produced between the stator 3 and rotor 4 by the traveling wave generated with the stator 3.

Figure 2:
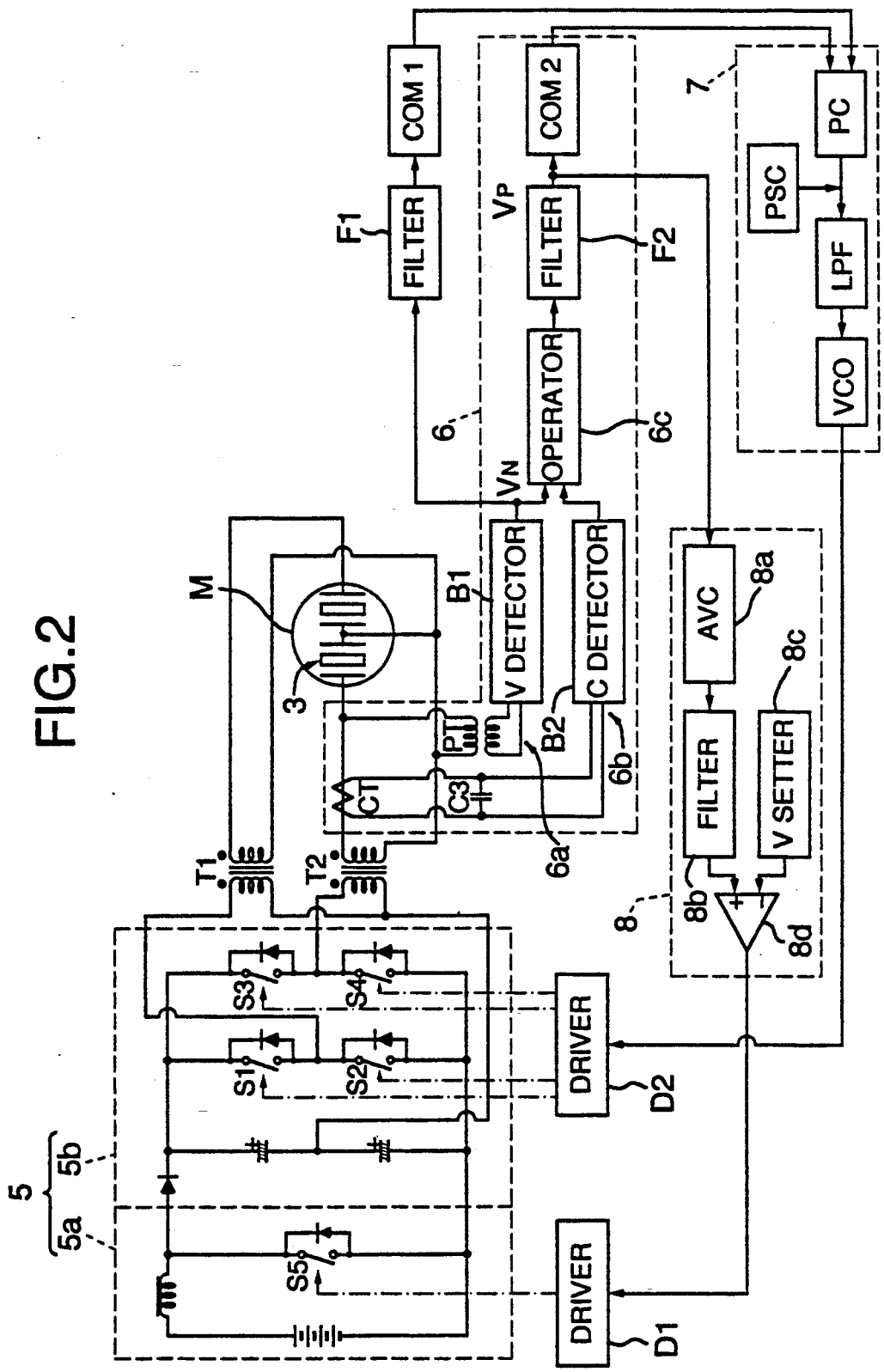
FIG. 2 is a block diagram of a circuitry.
Figure 5:
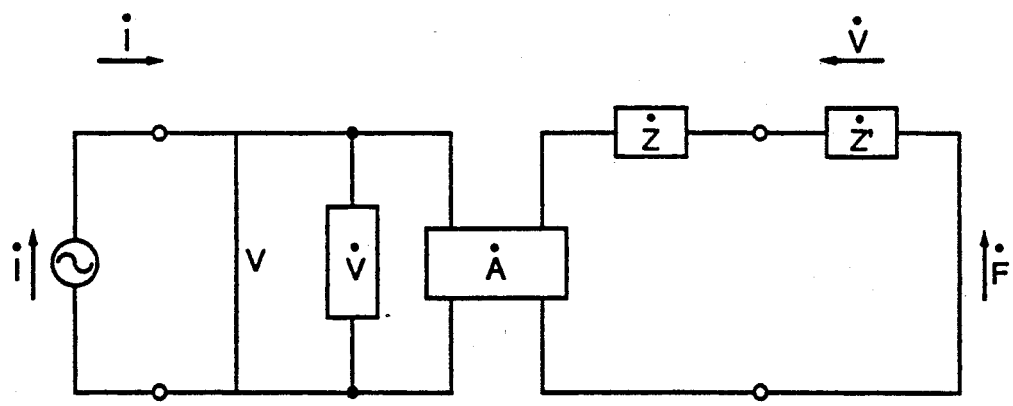
FIG. 5 is a diagram showing an equivalent circuit of a piezoelectric vibrator system.
Figure 6:
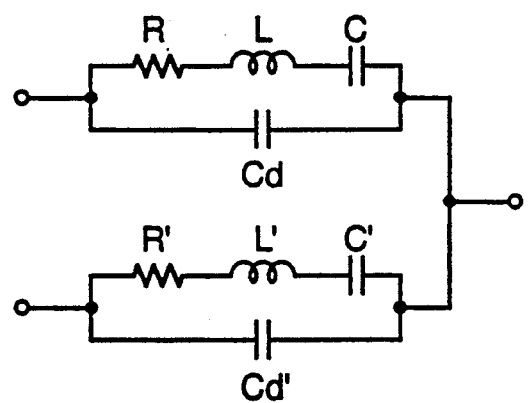
FIG. 6 is a diagram showing an equivalent circuit of the ultrasonic motor.
Figure 7:
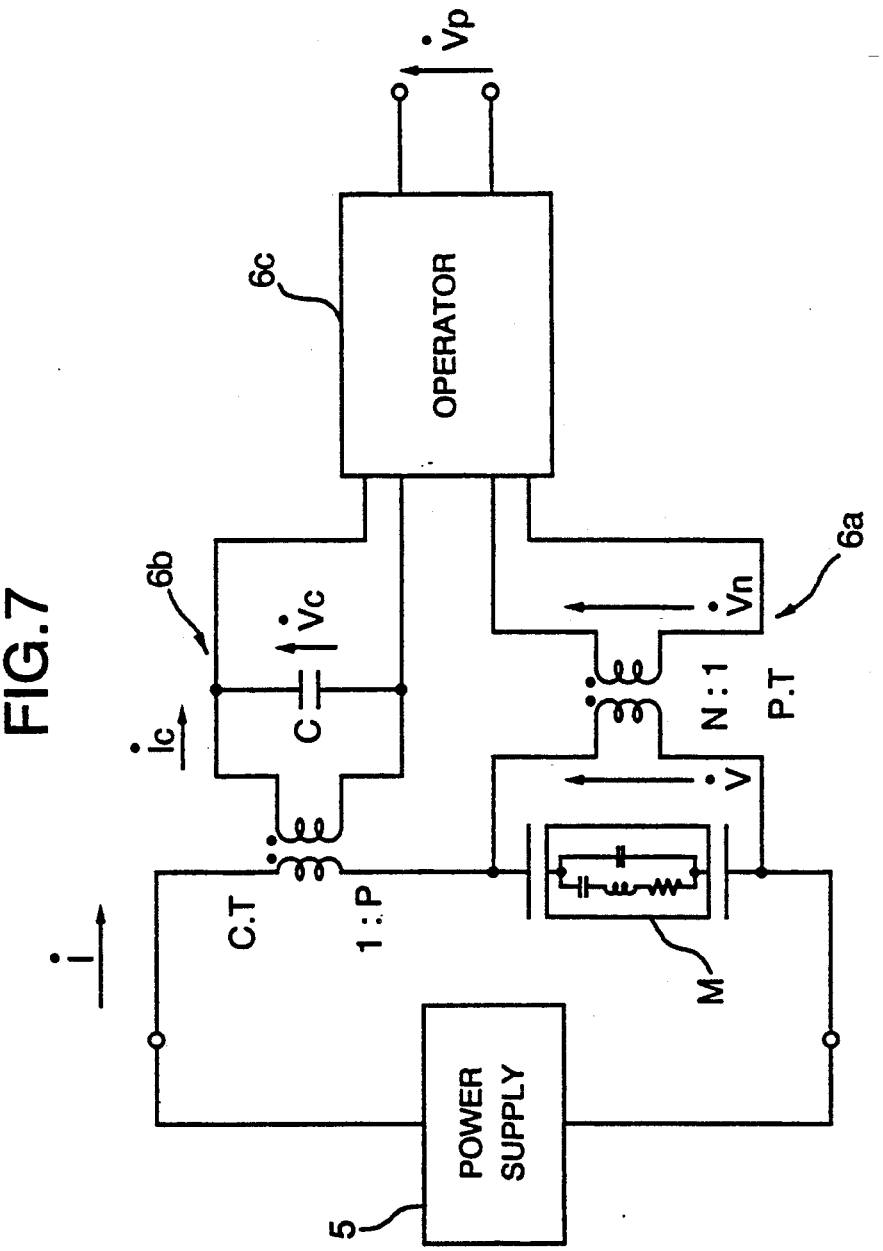
FIG. 7 is a circuit block diagram of a vibrator state signal generating device.

As shown in FIG. 2, an apparatus for driving and controlling the ultrasonic motor M comprises a power supply device 5 for supplying high frequency power, a vibrator state signal generating device 6 for generating a signal relating to vibrate changing rate of the vibrator 3', a frequency control device 7 for comparing phases of the signal output from the vibrator state signal generating device 6 and the above-mentioned voltage applied, and controlling oscillating frequency of the power supply device 5 to maintain the phase difference at a predetermined level, and a constant velocity amplitude control device 8 for controlling the voltage output from the power supply device 5, i.e. the voltage applied to the piezoelectric element 1, in response to the signal output from the vibrator state signal generating device 6.

The power supply device 5 includes a DC chopper circuit 5a in a forward stage and an inverter circuit 5b in a rearward stage thereof. The DC chopper circuit 5a varies the output voltage by varying conduction ratio of a switch S5 by means of a drive circuit D1 in response to the output signal of the constant velocity amplitude control device 8. The inverter circuit 5b varies the frequency by opening and closing switches S1–S4 by means of a drive circuit D2 in response to the output signal of the frequency control device 7.

The inverter circuit 5b comprises a combination of two sets of source dividing type half-bridge inverters for outputting two-phase square waves with a 90-degree phase difference. Respective output terminals are connected through raising and lowering transformers T1 and T2 to electrodes provided in the regions A and B of the piezoelectric element 1 of the ultrasonic motor M.

The square waves are shaped into sinusoidal waves by leakage inductances of the transformers T1 and T2.

The vibrator state signal generating device 6 includes a voltage detector 6a for detecting voltage V applied to the piezoelectric element 1, a current detector 6b for detecting electrification current I, an operating device 6c for differentially amplifying output signals of the detectors 6a and 6b.

The voltage detector 6a includes a bootstrap circuit B1 connected to a secondary side of a transformer PT having a turn ratio N:1. The current detector 6b includes a bootstrap circuit B2 connected through a capacitor C3 having a capacity C to a secondary side of a transformer CT having a turn ratio 1:P. Both detectors 6a and 6b are arranged on a secondary side of the transformer T2.

The constants N, P and C are in the relationship with capacitance Cd of the piezoelectric element 1 expressed by the following equation:

$$Cd = C\,P/N$$

The operating device 6c effects differential amplification of output voltage Vn of the voltage detecting device 6a and output voltage Vc of the current detecting device 6b and, as a result, outputs voltage Vp which, as described hereinbefore, includes a term representing a phase difference produced by a difference between the frequency of applied voltage V and resonant frequency of the vibrator 3'.

The frequency control device 7 is a phase-locked loop including a phase comparator PC, a low-pass filter LPF of the output inversion type, and a voltage control oscillator VCO. The voltage control oscillator has an output connected to the drive circuit D2.

A phase compensator PSC is disposed between the phase comparator PC and the low-pass filter LPF for compensating for output voltage of the phase comparator PC.

Figure 3:
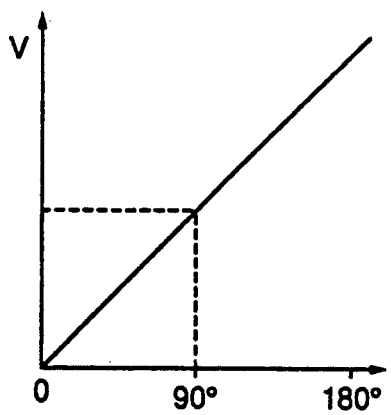
FIG. 3 is a view showing output characteristics of a phase comparator.

The phase comparator PC receives output voltage Vn of the voltage detecting device 6a and output voltage Vp of the operating device 6c through filters F1 and F2 and comparators COM1 and COM2, the latter shaping these signals into square waves. The phase comparator PC outputs a voltage corresponding to a phase difference between the two voltages Vn and Vp as shown in FIG. 3.

Figure 4:
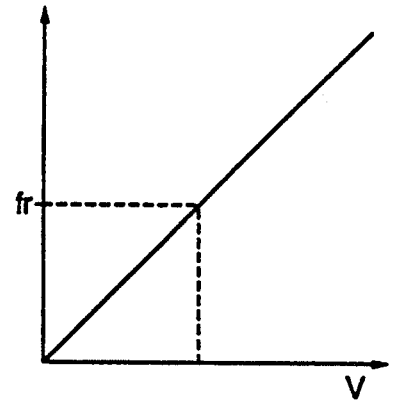
FIG. 4 is a view showing output characteristics of a voltage control oscillator.

The voltage control oscillator VCO outputs a frequency, as shown in FIG. 4, which is variable with the voltage output from the phase comparator PC and inverted by the low-pass filter LPF.

When the phase difference between the two voltages Vn and Vp is 90 degrees or less, the output voltage of the phase comparator PC becomes low. This results in a high frequency output from the voltage control oscillator VCO, which raises the oscillating frequency of the inverter circuit 5b.

Conversely, when the phase difference between the two voltages Vn and Vp exceeds 90 degrees, the output voltage of the phase comparator PC becomes high. This results in a low frequency output from the voltage control oscillator VCO, which lowers the oscillating frequency of the inverter circuit 5b.

The above operation maintains the phase difference between the two voltages Vn and Vp at 90 degrees. That is, drive is provided following the resonant frequency variable with variations in the temperature and the like of the vibrator 3'.

Further, the frequency control device 7 compensates for the output voltage of the phase comparator PC by means of the phase compensator. With this compensation, the oscillating frequency is controlled to be a slightly higher frequency than the resonant frequency, which is the frequency for driving the ultrasonic motor M most steadily and efficiently.

The constant velocity amplitude control device 8 includes an absolute value circuit 8a for effecting full wave rectification and smoothing of the output voltage Vp of the vibrator state signal generating device 6, a velocity setting circuit 8c for setting rotational speed of the ultrasonic motor M, and a comparator circuit 8d for comparing output voltage of the absolute value circuit 8a received through a filter 8b with output voltage of the velocity setting circuit 8c.

The comparator circuit 8d has an output connected to the drive circuit D1 which modulates pulsewidth of this output and opens and closes the switch S5. This varies the output voltage of the DC chopper circuit 5a.

When an average of the output voltage Vp is higher than the output voltage of the velocity setting circuit 8c, the output voltage of the comparator circuit 8d becomes "H". As a result, the drive circuit D1 lowers an opening and closing duty of the switch S5 to lower the output voltage of the DC chopper circuit 5a, thereby lowering the rotational speed.

Conversely, when the average of the output voltage Vp is lower than the output voltage of the velocity setting circuit 8c, the output voltage of the comparator circuit 8d becomes "L". As a result, the drive circuit D1 raises an opening and closing duty of the switch S5 to raise the output voltage of the DC chopper circuit 5a, thereby raising the rotational speed.

Other embodiments will be described next.

Figure 8:
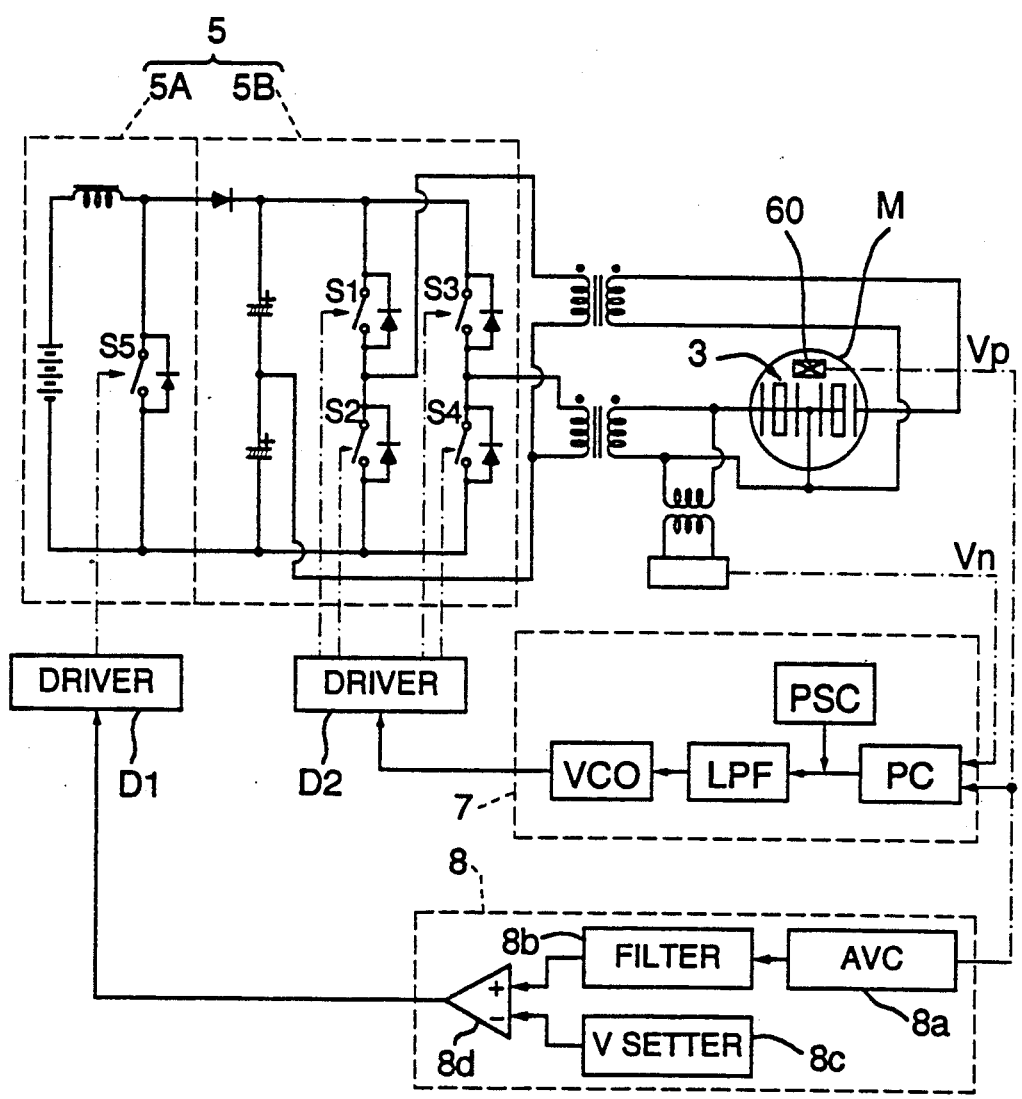
FIG. 8 is a circuit block diagram of another embodiment.

As distinct from the foregoing embodiment, the drive control apparatus according to the present invention shown in FIG. 8 includes a piezoelectric element 60 pasted to the vibrator 3 to act as the vibrator state signal generating device. This piezoelectric element 60 directly detects the vibrating state of the vibrator, and outputs a voltage Vp to the frequency control device 7 and constant velocity amplitude control device 8. This embodiment is the same as the foregoing embodiment in the other aspects except that the phase difference to be maintained is set to about 45 degrees. Thus, details of this embodiment will not be described to avoid repetition.

This construction provides a greater assurance that the vibrator 3 of the ultrasonic motor is driven with an optimal efficiency of electric/mechanical energy conversion.

Figure 9:
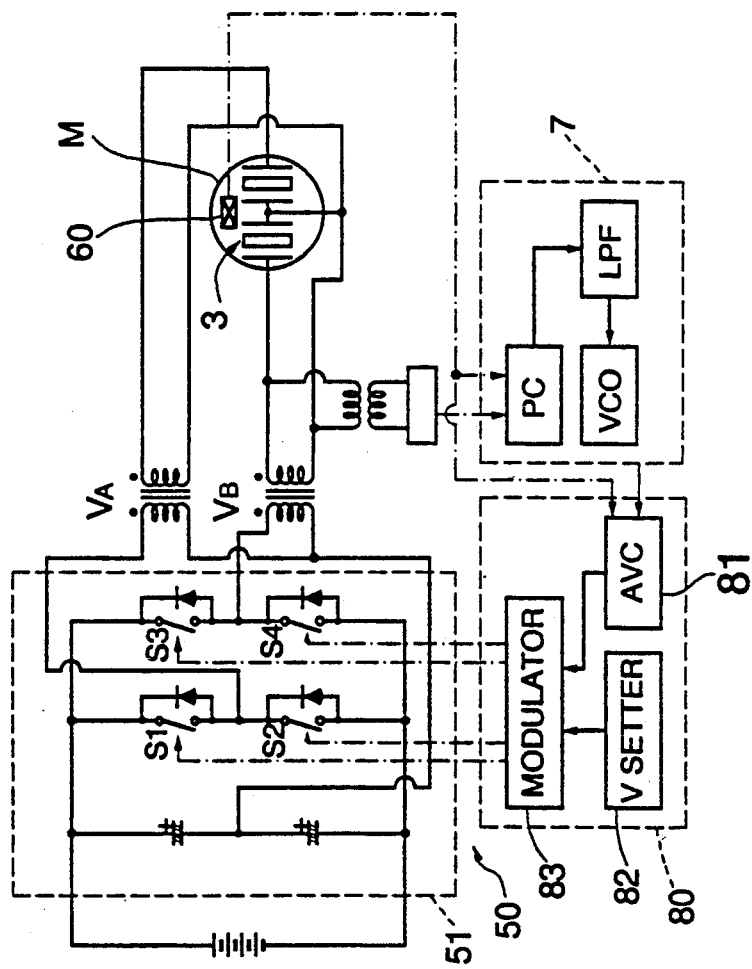
FIG. 9 is a circuit block diagram of still another embodiment.

The drive control apparatus according to the present invention shown in FIG. 9 differs from the preceding embodiments in inclusion of a power source 50 and in the way the power source 50 is controlled.

As shown in FIG. 9, the power source 50 comprises an inverter circuit 51 for supplying high frequency power to the piezoelectric element 1. The output frequency of the inverter circuit 51 is adjusted by the frequency control device 7. The duty cycle of its output pulses is adjusted by a constant velocity amplitude control device 80 acting as a duty cycle control device.

The inverter circuit 51 comprises a combination of two sets of source dividing type half-bridge inverters for outputting two-phase square waves with a phase difference. The respective outputs are connected through raising and lowering transformers to the regions A and B to apply thereto a maximum voltage of about 100 V with a frequency of about 40 kHz.

The vibrator 3 has a piezoelectric element 60 pasted thereto for detecting its vibrating state. The frequency control device 7 controls and varies oscillating frequency of the inverter circuit 51 to maintain at a predetermined level the phase difference between the output voltage of the vibrator state detecting device 9 and the voltage applied to the piezoelectric element 1. The duty cycle control device 80 controls and varies the duty cycles of output pulses of the inverter circuit 51 so that output voltage of the piezoelectric 60 is at a predetermined level.

That is, in order to compensate for variations in the drive speed caused by variations in the mechanical resonant frequency due to temperature variations of the vibrator 3, the frequency control device 7 provides controls to maintain the output frequency of the inverter circuit 51 displaced a fixed amount from the resonant frequency of the vibrator 3.

The duty cycle control device 80 serves the purpose of compensating for variations in the drive speed with respect to load disturbances.

The duty cycle control device 80 includes an absolute value circuit 81 for effecting full wave rectification and smoothing of the output voltage of the piezoelectric element 60, a velocity setting circuit 82 for setting rotational speed of the motor M, and a modulator 83 for varying pulsewidth of square wave input from the frequency control device 7 in accordance with a difference between voltages received from the circuits 81 and 82.

The inverter circuit 51 includes frequency variable switches S1–S4 operable by signals output from the duty cycle control device 80.

Figure 10A:
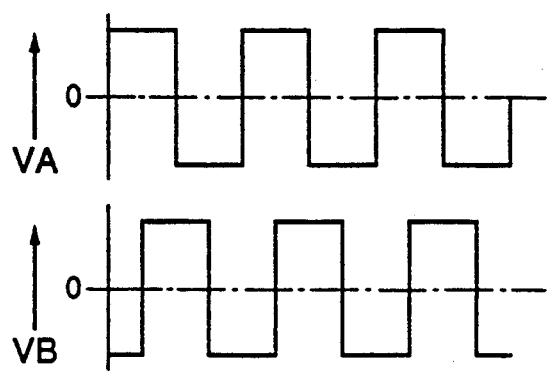
FIGS. 10A, 10B and 10C are views showing waveforms of voltages applied to a piezoelectric element.
Figure 10B:
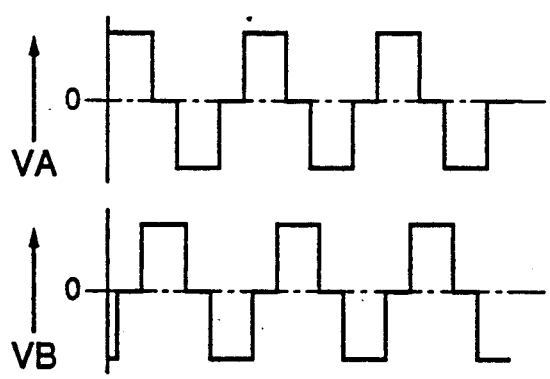
Figure 10C:
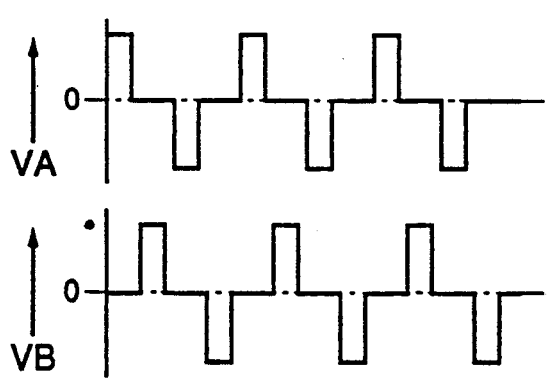

This aspect will be described more particularly with reference to FIGS. 10A, 10B and 10C. As shown in FIGS. 10A, 10B and 10C, when the duty cycle of the output pulses of the inverter circuit 51 is varied under control, the voltage applied to the piezoelectric element is constant but application time, i.e. quantity of power supply, is varied. This produces substantially the same effect as when the voltage is varied to vary the quantity of power supply.

For example, when the motor drive rate lowers, the duty cycle is increased to increase the power supply (FIG. 10A). When the motor drive rate rises, the duty cycle is decreased to decrease the power supply (FIG. 10C). The power supply shown in FIG. 10B is intermediate between the power supplies shown in FIGS. 10A and 10C.

Steady drive may be provided also against load variations by controlling the duty cycle on the basis of the output of the vibration state signal generating device such as the piezoelectric element 60 that detects the vibrating state of the vibrator.

This feature can dispense with the chopper circuit, thereby achieving a compact and low-cost source circuit.

Optional modifications workable in accordance with the present invention will be described next.

1. In the foregoing embodiments, the voltage detecting device 6a includes the transformer PT having a turn ratio of N:1. This transformer PT may be replaced with a series connection of resistors having a resistance ratio of N−1:1 to take out $\dot{V}n$.
2. In the foregoing embodiments, the transformer T2 is disposed on the secondary side of the vibrator state signal generating device 6. The transformer T1 may be disposed on the secondary side instead, or both transformers T1 and T2 may be disposed on the secondary side.
3. In the foregoing embodiments, the phase comparator PC receives voltages $\dot{V}n$ and $\dot{V}p$ through the comparators COM1 and COM2. The voltage V applied to the piezoelectric element 1 may be input through the comparator COM1 instead of voltage $\dot{V}n$.
4. The foregoing embodiments have been described in relation to a rotary type ultrasonic motor including a stator acting as a vibrator. The ultrasonic motor may have a rotor acting as the vibrator, or may be a linear ultrasonic motor comprising piezoelectric elements provided at ends of a columnar elastic element and a slider slidable along the elastic element.

Further, the motor may be an ultrasonic motor of the composite vibrator type that combines two vibrations to control locus of motion of a material point. In this case, the steadiest and most efficient drive is possible by maintaining the phase difference between voltages $\dot{V}n$ and $\dot{V}p$ at 90 degrees.

What is claimed is:

1. A drive control apparatus for an ultrasonic motor having a vibrator with a piezoelectric element and an elastic element, said apparatus comprising:
    a power source for supplying alternating power to said piezoelectric element;
    voltage detecting means for detecting a voltage supplied to said vibrator;
    current detecting means for detecting a current supplied to said vibrator;
    a vibrator state signal generating means for generating a vibrator state signal proportional to a vibrating velocity of said vibrator by utilizing the signals from both of said voltage detecting means and said current detecting means;
    a first control device that outputs a first signal generated in response to the phase difference between said vibrator state signal and the signal from said voltage detecting means;
    a second control device that outputs a second signal generated by comparing said vibrator state signal voltage with a reference voltage;
    said power source having a supply frequency control portion and a supply power control portion;
    said supply frequency control portion receiving said first signal from said first control device and adjusting the frequency of said alternating power responsive to said first signal so as to maintain an oscillation frequency of said vibrator near the resonance frequency of said vibrator by keeping said phase difference at a predetermined value; and said supply power control portion receiving said second signal from said second control device and adjusting said alternating power responsive to said second signal in order to stabilize a rotation speed of said ultrasonic motor.

2. The drive control apparatus for an ultrasonic motor as claimed in claim 1, wherein said voltage reference is adjustable and may be used to stabilize the rotation speed of said ultrasonic motor.

3. The drive control apparatus for an ultrasonic motor as claimed in claim 1, wherein said reference voltage is adjustable and may be used to alter the rotation speed of said ultrasonic motor.

4. The drive control apparatus for an ultrasonic motor as claimed in claim 1, wherein said predetermined value is 90 degrees.

5. The drive control apparatus for an ultrasonic motor as claimed in claim 1, wherein said supply frequency control portion is formed as an inverter circuit, and said supply power control portion is formed as a DC chopper circuit.

6. The drive control apparatus for an ultrasonic motor as claimed in claim 1, wherein said power source is formed as an inverter circuit, with said alternating power adjusted by altering the duty cycle of said inverter circuit.

7. The drive control apparatus for an ultrasonic motor as claimed in claim 1, wherein said voltage detecting means includes a first transformer and a first bootstrap circuit connected to said first transformer, said current detecting means includes a second transformer, and a second bootstrap circuit connected to said second transformer, said second transformer having a capacitor on the secondary side; and with a turn ratio of said first transformer, a turn ratio of said second transformer, and a capacitance of said capacitor chosen such that said vibrator state signal is proportional to the velocity of said vibrator.

8. The drive control apparatus for an ultrasonic motor as claimed in claim 1, wherein said first control device includes a phase compensator that sustains said oscillation frequency of said vibrator slightly higher than the resonance frequency in order to drive said ultrasonic motor steadily and efficiently, and to alter a rotation speed of said ultrasonic motor.

9. A drive control apparatus for an ultrasonic motor having a vibrator with a piezoelectric element and an elastic element, said apparatus comprising:

a power source for supplying alternating power to said piezoelectric element;

voltage detecting means for detecting a voltage supplied to said vibrator;

a sensor means for generating a vibrator state signal proportional to a vibrating velocity of said vibrator;

a first control device that outputs a first signal generated in response to the phase difference between said vibrator state signal and the signal from said voltage detecting means;

a second control device that outputs a second signal generated by comparing said vibrator state signal voltage with a reference voltage;

said power source having a supply frequency control portion and a supply power control portion;

said supply frequency control portion receiving said first signal from said first control device and adjusting the frequency of said alternating power responsive to said first signal so as to maintain an oscillation frequency of said vibrator near the resonance frequency of said vibrator by keeping said phase difference at a predetermined value; and said supply power control portion receiving said second signal from said voltage control device and adjusting said alternating power responsive to said second signal in order to stabilize a rotation speed of said ultrasonic motor.

10. The drive control apparatus for an ultrasonic motor as claimed in claim 9, wherein said voltage reference is adjustable and may be used to stabilize the rotation speed of said ultrasonic motor.

11. The drive control apparatus for an ultrasonic motor as claimed in claim 9, wherein said reference voltage is adjustable and may be used to alter the rotation speed of said ultrasonic motor.

12. The drive control apparatus for an ultrasonic motor as claimed in claim 9, wherein said sensor means is a piezoelectric element provided on said vibrator.

13. The drive control apparatus for an ultrasonic motor as claimed in claim 9, wherein said supply frequency control portion is formed as an inverter circuit, and said supply power control portion is formed as a DC chopper circuit.

14. The drive control apparatus for an ultrasonic motor as claimed in claim 9, wherein said power source is formed as an inverter circuit, with said alternating power adjusted by altering the duty cycle of said inverter circuit.

15. The drive control apparatus for an ultrasonic motor as claimed in claim 9, wherein said first control device includes a phase compensator that sustains said frequency of said vibrator slightly higher than the resonance frequency of said vibrator in order to drive said ultrasonic motor steadily and efficiently, and to alter the rotation speed of said ultrasonic motor.

* * * * *